United States Patent [19]

Darnell et al.

[11] Patent Number: 5,342,902
[45] Date of Patent: Aug. 30, 1994

[54] POLY(ESTER-ETHER) COMPOSITIONS HAVING INCREASED THERMAL STABILITY

[75] Inventors: W. Ronald Darnell, Weber City, Va.; W. J. Jackson, Jr., Kingsport, Tenn.

[73] Assignee: Eastman Chemical Company, Kingsport, Tenn.

[21] Appl. No.: 117,588

[22] Filed: Sep. 7, 1993

[51] Int. Cl.$^5$ .............................................. C08F 20/00
[52] U.S. Cl. ..................... 525/437; 528/88; 528/97; 528/102; 528/106; 528/272; 528/279; 528/283; 528/298; 528/302; 528/307; 528/308; 528/308.6; 524/779; 524/783; 264/176.1; 264/239
[58] Field of Search ............... 528/272, 279, 283, 298, 528/302, 307, 308, 308.6, 88, 97, 102, 106; 525/437; 524/783, 779; 264/176.1, 239

[56] References Cited

U.S. PATENT DOCUMENTS 4,124,566 11/1978 Saiki et al. .......................... 528/177

*Primary Examiner*—Samuel A. Acquah
*Attorney, Agent, or Firm*—John D. Thallemer

[57] ABSTRACT

The present invention relates to poly(ester-ether) compositions and to a process for their preparation. In particular, the invention relates to poly(ester-ether) compositions obtained by reacting a polyester which is prepared from a dicarboxylic acid and an aliphatic diol with a dihydroxy aromatic compound in the presence of a metal catalyst. Incorporation of the dihydroxy aromatic compound into the polyester chain causes an increase in the Tg value and increases the thermal stability of the polyester. These poly(ester-ether) compositions are useful in molded articles of all types.

25 Claims, No Drawings

POLY(ESTER-ETHER) COMPOSITIONS HAVING INCREASED THERMAL STABILITY

FIELD OF THE INVENTION

The present invention relates to poly(ester-ether) compositions and to a process for their preparation. In particular, the invention relates to poly(ester-ether) compositions obtained by reacting a polyester which is prepared from a dicarboxylic acid and an aliphatic diol with a dihydroxy aromatic compound in the presence of a metal catalyst. Incorporation of the dihydroxy aromatic compound into the polyester chain causes an increase in the Tg value and increases the thermal stability of the polyester. These poly(ester-ether) compositions are useful in molded articles of all types.

BACKGROUND OF THE INVENTION

When a polyester is treated at elevated temperatures with a diol, the expected reaction is a transesterification reaction in which diol moieties of the polyester chain are liberated and new diol moieties are inserted into the polyester chain. In contrast, the present inventors have unexpectedly discovered that where the diol reactant is different from that of the diol moieties in the starting polyesters, copolymers are obtained. More specifically, the present inventors have determined that dihydroxy aromatic compounds inserted into the chain of a polyester which is prepared from a dicarboxylic acid and an aliphatic diol, have predominantly ether linkage rather than ester linkages. Thus, poly(ethylene terephthalate) treated with hydroquinone, for example, has mono- and diether linkages. Incorporation of the dihydroxy aromatic compounds into the polyester chain causes an increase in the glass transition temperature (Tg) value and the thermal stability of the polyester. For example, the Tg value of poly(ethylene terephthalate) has been increased from 72° C. to 100° C. by modification with certain dihydroxy aromatic compounds.

SUMMARY OF THE INVENTION

Accordingly, it is one object of the present invention to provide poly(ester-ether) compositions. Accordingly, it is another object of the invention to provide a process for preparing poly(ester-ether) compositions which are useful in applications requiring thermal stability.

These and other objects are accomplished herein by a poly(ester-ether) composition having improved thermal stability comprising repeat units from the reaction of (1) 10 to 175 mole percent based on the repeat units of the polyester, component (2), of at least one dihydroxy aromatic compound, with (2) a polyester consisting essentially of repeat units from:
(a) at least one dicarboxylic acid; and
(b) at least one diol selected from the group consisting of aliphatic and cycloaliphatic diols, provided that at least 50 mole percent of the diol is an aliphatic diol having 2 to 20 carbon atoms, based on 100 mole percent dicarboxylic acid and 100 mole percent diol.

The present invention also relates to a process for preparing a poly(ester-ether) having improved thermal stability comprising (I) reacting (1) 10 to 175 mole percent based on the repeat units of the polyester, component (2), of at least one dihydroxy aromatic compound, with (2) a polyester consisting essentially of repeat units from:
(a) at least one dicarboxylic acid; and
(b) at least one diol selected from the group consisting of aliphatic and cycloaliphatic diols, provided that at least 50 mole percent of the diol is an aliphatic diol having 2 to 20 carbon atoms, based on 100 mole percent dicarboxylic acid and 100 mole percent diol; and (II) forming the poly(ester-ether) into a molded or extruded article.

DESCRIPTION OF THE INVENTION

The present invention relates to poly(ester-ether) compositions which contain repeat units from the reaction of a dihydroxy aromatic compound, component (1), with a polyester, component (2). Dihydroxy aromatic compounds suitable for use as component (1) include: hydroquinone, resorcinol, catechol, 4,4'-biphenol, bisphenol A, phenylhydroquinone, methylhydroquinone, 1,4-dihydroxynaphthalene, and chlorohydroquinone. From to 175 mole percent, based on the repeat units of the polyester, of the dihydroxy aromatic compound is reacted with the polyester. Preferably, the dihydroxy aromatic compound is used in an amount of 20 to 60 mole percent, more preferably 30 to 40 mole percent, based on the repeat units of the polyester. Using less than 10 mole percent of the dihydroxy aromatic compound does not have a significant effect on increasing the Tg of the polymer. Using greater than 175 mole percent of the dihydroxy aromatic compound results in unacceptable levels of branching and a brittle polymer.

Polyesters, component (2), which are useful in the present invention contain repeat units from at least one dicarboxylic acid and at least one aliphatic or a combination of aliphatic and cycloaliphatic diols. The dicarboxylic acid, component (a), is selected from aliphatic dicarboxylic acids preferably having 4 to 14 carbon atoms, cycloaliphatic dicarboxylic acids preferably having 8 to 12 carbon atoms, and aromatic dicarboxylic acids preferably having 8 to 14 carbon atoms. Examples of these dicarboxylic acids include 2,6-, 1,5-, 1,8- or 2,7-naphthalene dicarboxylic acid, succinic, dodecanedioic, glutaric, adipic, trimethyladipic, pimelic, 2,2-dimethylglutaric, azelaic, sebacic, fumaric, suberic, 1,3-cyclopentane dicarboxylic, 1,2-cyclohexanedicarboxylic, 1,3-cyclohexanedicarboxylic, 1,4-cyclohexanedicarboxylic, phthalic, terephthalic, isophthalic, 2,5-norbornanedicarboxylic, diphenic, 4,4'-oxydibenzoic, diglycolic, thiodipropionic, and 4,4'-sulfonyldibenzoic. The anhydride, acid chloride, and ester derivatives of the above acids may also be used. The preferred dicarboxylic acid(s) are isophthalic acid and terephthalic acid.

The diol component, component (b), of the polyester consists of at least 50 mole percent of an aliphatic diol having 2 to 20 carbon atoms, based on 100 mole percent dicarboxylic acid and 100 mole percent diol. In addition to the aliphatic diol, a cycloaliphatic diol may also be present in an amount up to 50 mole percent. The cycloaliphatic diol preferably has 6 to 20 carbon atoms. Included within the class of aliphatic diols are aliphatic diols having ether linkages such as polydiols having 4 to 800 carbon atoms. Suitable aliphatic diols include: ethylene glycol, diethylene glycol, triethylene glycol, 1,2-propanediol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,4-butanediol, 1,5-pentanediol, 1,6-hexanediol, and 2,2,4-trimethyl-1,6-hexanediol. Suitable cycloaliphatic diols to be used with the aliphatic diol(s) include: 1,2-cyclohexanedimethanol, 1,3-cyclohexanedimethanol, and 1,4-cyclohexanedimethanol.

Semi-crystalline and amorphous materials are within the scope of the present invention. In addition, scrap or recycled poly(ethylene terephthalate) may also be used. It is to be understood that the polyesters of this invention contain substantially equal molar proportions of acid equivalents (100 mole %) to hydroxy equivalents (100 mole %). Thus, the polyester comprised of components (a) and (b) will have a total of acid and hydroxyl equivalents equal to 200 mole percent. The polyesters have an inherent viscosity of up to 1.0 dl/g, preferably 0.2 to 0.6 dl/g.

The polyester, component (2) can be prepared by conventional polycondensation procedures well-known in the art. Such processes include direct condensation of the dicarboxylic acid(s) with the diol(s) or by ester interchange using lower alkyl esters. For example, a typical procedure consists of two stages. The first stage, known as ester-interchange or esterification, is conducted in an inert atmosphere at a temperature of 175° C. to 240° C. for 0.5 to 8 hours, preferably 1 to 4 hours. The diols, depending on their particular reactivities and the specific experimental conditions employed, are commonly used in molar excesses of 1.05 to 2.5 per mole of total dicarboxylic acid.

The second stage, referred to as polycondensation, is conducted under reduced pressure at a temperature of 230° C. to 350° C., preferably 265° C. to 325° C., and more preferably 270° C. to 290° C. for 0.1 to 6 hours, preferably 0.25 to 2 hours. Because high melt viscosities are encountered in the polycondensation stage, it is sometimes advantageous to employ temperatures above 300° C. since the resulting decrease in melt viscosity allows somewhat higher molecular weights to be obtained. Stirring or appropriate conditions are employed in both stages to ensure sufficient heat transfer and surface renewal for the reaction mixture. The reactions of both stages are facilitated by appropriate catalysts which are well known in the art. Suitable catalysts include, but are not limited to, alkoxy titanium compounds, alkali metal hydroxides and alcoholates, salts of organic carboxylic acids, alkyl tin compounds and metal oxides.

The poly(ester-ether) compositions are prepared by heating the polyester, component (2), with up to 175 mole percent, based on the repeat unit of the polyester, of the dihydroxy aromatic compound, component (1), in the absence of air for a sufficient time to cause a reaction between the dihydroxy aromatic compound and the polyester. Reaction time for the poly(ester-ether) and dihydroxy aromatic compound are generally in the range of 1 hour to 12 hours at temperatures of 200° C. to 290° C. depending on the polyester being used. Vacuum is then applied for 30 minutes to 5 hours at a temperature of 270° C. to 300° C. to build up the molecular weight of the poly(ester-ether). The polyester, component (2), does not have to be completely molten, especially during the early part of the reaction. The poly(ester-ether) is extruded into strands and pelletized.

Optionally, a metal catalyst, component (3), is added to the ether forming reaction. The metal catalyst is preferably present in an amount of 50 ppm catalyst (metal) to 600 ppm catalyst (metal). The catalyst may be one or more of the ester exchange and/or polycondensation catalysts known in the art. Preferably, the catalyst is titanium or tin derived from tetraisopropyl titanate or stannous oxalate. In many cases, it is advantageous to add a co-catalyst, such as a potassium salt, e.g. potassium carbonate, along with the titanium and tin catalysts, to obtain reduced color in the poly(ester-ether) product. It has also been found that zeolite molecular sieves, such as zeolite 4A, can be used as the catalyst. The color of the product increases appreciably as the catalyst metals content increases, and the poly(ester-ether) products may become appreciably branched at the higher catalyst metals contents.

For those poly(ester-ether) products which have sufficient crystallinity, the molecular weight of the poly(ester-ether) may be increased by solid state polymerization. For example, poly(ester-ether) powders, granules, or pellets may be heated under vacuum or heated while passing an inert gas through the reaction vessel to remove liberated condensation by-products. Solid state polymerization is generally conducted for 1 to 24 hours to provide high molecular weight polymers with inherent viscosities of 0.7 to 1.2.

Additives such as fillers, stabilizers, antioxidants, buffers, colorants, dyes, pigments and the like normally used with polymers may be used if desired. Such additives, their amounts, and their use are well known in the art.

The poly(ester-ether) products of this invention are readily melt processed into useful shapes and forms. For example, they may be melt pressed or extruded into films, extruded into rods or other shapes, injection molded or compression molded into various objects, and injection molded preforms may be reheated and blown into bottles, jars and the like.

The materials and testing procedures used for the results shown herein are as follows:

Inherent viscosity (I.V.) was measured at 25° C. using 0.50 grams of polymer per 100 ml of a solvent consisting of 60% by weight phenol and 40% by weight tetrachloroethane. The polymer samples were dissolved without heat.

Ti catalyst source was titanium tetraisopropoxide in n-butanol.

Sn catalyst source was n-butylstannoic acid or stannous oxalate as noted.

Film Strength. Films of vacuum-dried polymer were pressed at 270° C. for 15–20 sec. on a Hannafin press at the final vacuum build up temperature, quenched in cold water and the film strength was assessed by hand creasing.

Mole % Bisphenol A was determined by H Nmr in trifluoracetic acid. The mole % Bisphenol A was calculated as the total Bisphenol A species divided by the total Bisphenol A species plus the total ethylene glycol-derived species multiplied by 100.

Mole % hydroquinone (HQ) was determined by H Nmr in trifluoracetic acid and CDCl$_3$. Mole % HQ is calculated as the total amount of hydroquinone (—O—PH—O—) species (whether present as ester, monoethyl ether, or bisethyl ether of hydroquinone) divided by the sum of the total of the hydroquinone species plus the calculated amount of ethylene glycol-derived species (ester+ethers) multiplied by 100. The amount of diethylene glycol species is excluded from the ethylene glycol-derived species.

Mole % of ester/mono/bis(ethyl ether) of hydroquinone was determined by H Nmr in trifluoracetic acid and CDCl$_3$.

Mz/Mn was determined as PET equivalents by mixed column Gel Permeation Chromatography (GPC) in 70/30 CH$_2$Cl$_2$/HFIP.

Glass transition temperature (Tg) was determined using a differential scanning calorimeter (DSC).

Melting point (Tm) was determined using a differential scanning calorimeter (DSC).

The composition and process of the present invention will be further illustrated by a consideration of the following examples, which are intended to be exemplary of the invention. All parts and percentages in the examples are on a weight basis unless otherwise stated.

EXAMPLE 1

Reaction of HQ and PET without additional catalyst.

Polyethylene terephthalate was prepared using dimethyl terephthalate and ethylene glycol. The catalyst system contained 75 ppm of manganese, 225 ppm of antimony, 80 ppm of cobalt, 20 ppm of titanium and 125 ppm of phosphorous. The PET had a I.V. of 0.61 dL/g.

The polyethylene terephthalate, prepared above, 38.4 grams (0.2 moles) and 8.8 grams (0.08 moles) of hydroquinone were placed into a glass flask equipped with a metal stirrer and provisions for applying vacuum and maintaining a nitrogen atmosphere. The flask was evacuated and flushed with nitrogen three times. The flask was partially immersed in a Belmont metal bath at 120° C. The metal bath temperature was immediately increased to 270° C. which took 15-20 minutes to attain. Stirring was begun as soon as the starting materials partially melted. The reaction mixture was stirred under nitrogen for 120 minutes at 270° C., then for 60 minutes at 290° C. Vacuum was applied for 10-15 minutes, and the molecular weight of the polymer was built up under high vacuum (<0.5 torr) as indicated in the table. The polymer was allowed to cool to room temperature under a nitrogen atmosphere.

The polymer had an I.V. of 0.42, a melting point of 208° C., and a Tg of 78° C. Proton NMR analysis indicated that the polymer contained 17 mole % hydroquinone moieties (21 mole % was present as the ester, 63 mole % was present as the monoether and 16 mole % was present as the diether). Additional test results are summarized in Table I.

EXAMPLE 2

Reaction of HQ with bis(2-hydroxyethyl)terephthalate.

Bis(2-hydroxyethyl)terephthalate, 50.8 grams, (0.2 moles), 8.8 grams (0.08 moles) of hydroquinone and 0.11 grams of stannous oxalate (150 ppm Sn based on polymer weight) were placed into a glass flask equipped with a metal stirrer and provisions for applying vacuum and maintaining a nitrogen atmosphere. The polymer was prepared using the procedure set forth in Example 1. Reaction times and temperatures are listed in Table I. The yield of polymer was 40.73 grams (96% yield).

The polymer had an I.V. of 0.63, a melting point of 211° C. (ΔHf=2.4 cal/g), and a PET equivalent molecular weight (determined by GPC analysis in methylene chloride/hexafluoroisopropanol mixed solvent) as follows: Mn 18,564; Mw 68,899; Mz 260,930; Mw/Mn 3.71; Mz/Mn 14.05. Proton NMR analysis indicated that the polymer contained 12.7 mole % hydroquinone and 5.68 mole % diethylene glycol. Of the hydroquinone present in the polymer, 0.67 mole % was present as the ester, 43.6 mole % was present as the monoether and 55.7 mole % was present as the diether. Additional test results are summarized in Table I.

EXAMPLES 3-11

Reaction of PET With Hydroquinone

The reactions were conducted using the procedure set forth in Example 1. Reaction times and temperatures are listed in Table I. The test results are summarized in Table I.

The results in Table I clearly shows that the Tg of PET is significantly increased from 78 to 104° C. by reacting the PET with a dihydroxy aromatic compound. In addition, the results show that a low molecular weight polyester of bis(2-hydroxyethyl)terephthalate can be significantly increased by reacting the polyester with with a dihydroxy aromatic compound. It is important to note that Example 10 sets forth the upper limit of 175 mole percent. Example 11 which is above 175 mole percent forms a brittle film.

EXAMPLES 12-18

Reaction of PET With Bisphenol A.

The polyethylene terephthalate, prepared in Example 1, 38.4 grams (0.2 moles), the mole percent of bisphenol A as listed in Table II, and Sn from n-butylstannoic acid, or Ti from titanium tetraisopropoxide in n-butanol solution, or a mixture of the Sn/Ti were placed into a glass flask equipped with a metal stirrer and provisions for applying vacuum and maintaining a nitrogen atmosphere. The reactions were conducted using the procedure set forth in Example 1. Specific reaction times and temperatures are listed in Table II along with the test results.

The results in Table II clearly show that PET modified with the dihydroxy aromatic compounds achieve high inherent viscosities. In addition, the results show that hexafluorobisphenol A does not work as a dihydroxy aromatic compound.

EXAMPLES 19-22

Reaction of PET With 4,4'-Biphenol

The polyethylene terephthalate, prepared in Example 1, 38.4 grams (0.2 moles), the mole percent of 4,4'-Biphenol as listed in Table III, and Sn from n-butylstannoic acid, and/or Ti from titanium tetraisopropoxide in n-butanol solution, were placed into a glass flask equipped with a metal stirrer and provisions for applying vacuum and maintaining a nitrogen atmosphere. The reactions were conducted using the procedure set forth in Example 1. Specific reaction times and temperatures are listed in Table III along with the test results.

The results in Table III clearly show that the Tg of PET is significantly increased by reacting the PET with a dihydroxy aromatic compound. In addition, the results show that high levels of branching (large Mz/Mn) may lead to brittle films as determined by Example 21.

EXAMPLES 23-43

Reaction of PET with Hydroquinone in the presence of Potassium Carbonate

The polyethylene terephthalate, prepared in Example 1, 38.4 grams (0.2 moles), the mole percent of hydroquinone as listed in Table IV, Ti from titanium tetraisopropoxide in n-butanol solution, and potassium carbonate, were placed into a glass flask equipped with a metal stirrer and provisions for applying vacuum and maintaining a nitrogen atmosphere. The reactions were conducted using the procedure set forth in Example 1. Specific reaction times and temperatures are listed in Table IV along with the test results.

The results in Table IV clearly show that potassium carbonate improves the color of the polymers.

EXAMPLES 44–57

Thermal Stability of PET Polymers Modified With Hydroquinone

The polyethylene terephthalate, prepared in Example 1, 38.4 grams (0.2 moles), the mole percent of hydroquinone as listed in Table V, and the catalysts as indicated in Table V, were placed into a glass flask equipped with a metal stirrer and provisions for applying vacuum and maintaining a nitrogen atmosphere. The reactions were conducted using the procedure set forth in Example 1. A sample of PET without any aromatic diol was used as a comparison example. The polymers were evaluated for thermal stability by thermal gravimetric analysis. The test results are summarized in Table V.

The results in Table V clearly show that PET reacted with a dihydroxy aromatic compound are much more stable than the control PET sample.

EXAMPLES 58–64

Reaction of PET with Hydroquinone in the presence of Zeolite 4A Molecular Sieve Catalyst The polyethylene terephthalate, prepared in Example 1, 38.4 grams (0.2 moles), the mole percent of hydroquinone as listed in Table VI, and the indicated amount of Zeolite 4A molecular sieve powder as catalyst/promoter, were placed into a glass flask equipped with a metal stirrer and provisions for applying vacuum and maintaining a nitrogen atmosphere. The reactions were conducted using the procedure set forth in Example 1. Specific reaction times and temperatures are listed in Table VI along with the test results.

The results in Table VI clearly show that zeolites can be used as catalysts in amounts of 0.1 to less than 5.0 weight percent. Moreover, 1.0 weight percent is the preferred amount.

EXAMPLES 65–75

Reaction of PET With Hydroquinone and Ethylene Glycol.

The polyethylene terephthalate, prepared in Example 1, 38.4 grams (0.2 moles), the mole percent of hydroquinone as listed in Table VII, the indicated amount of ethylene glycol, and Sn from stannous oxalate, and/or Ti from titanium tetraisopropoxide in n-butanol solution, were placed into a glass flask equipped with a metal stirrer and provisions for applying vacuum and maintaining a nitrogen atmosphere. The reactions were conducted using the procedure set forth in Example 1. Specific reaction times and temperatures are listed in Table VII along with the test results.

The results in Table VII clearly show that the Tg of PET can be significantly increased by reacting PET with a dihydroxy aromatic compound and ethylene glycol.

EXAMPLES 75–78

Reaction of PET With Phenylhydroquinone

The polyethylene terephthalate, prepared in Example 1, 38.4 grams (0.2 moles), the mole percent of phenylhydroquinone as listed in Table VIII, and Sn from stannous oxalate, and/or Ti from titanium tetraisopropoxide in n-butanol solution, were placed into a glass flask equipped with a metal stirrer and provisions for applying vacuum and maintaining a nitrogen atmosphere. The reactions were conducted using the procedure set forth in Example 1. Specific reaction times and temperatures are listed in Table VIII along with the test results.

The results in Table VIII indicate that certain dihydroxy aromatic compounds such as phenylhydroquinone require larger amounts of catalyst to react with PET probably because of steric hinderance.

EXAMPLES 79–82

Reaction of Selected Terephthalate Homo- and Copolyesters with Hydroquinone

Polymer A or Polymer B, 54.8 grams (0.2 moles), the mole percent of hydroquinone as listed in Table IX, and Sn from stannous oxalate, and/or Ti from titanium tetraisopropoxide in n-butanol solution, were placed into a glass flask equipped with a metal stirrer and provisions for applying vacuum and maintaining a nitrogen atmosphere. The reactions were conducted using the procedure set forth in Example 1. Specific reaction times and temperatures are listed in Table IX along with the test results.

The results in Table IX clearly shows that the polyesters based on 1,4-cyclohexanedimethanol were not as reactive as the polyesters prepared from PET. In addition, the PET copolyester containing 33 mole % 1,4-cyclohexanedimethanol was much more reactive than those polymers based on 100 mole % 1,4-cyclohexanedimethanol.

EXAMPLES 83–88

Reaction of Various Polyesters With Aromatic Diols.

Polymers D, F, G, H, and I, 0.2 moles, the mole percent of hydroquinone (HQ), or bisphenol A (BPA), as listed in Table X, and Sn from stannous oxalate, and/or Ti from titanium tetraisopropoxide in n-butanol solution, were placed into a glass flask equipped with a metal stirrer and provisions for applying vacuum and maintaining a nitrogen atmosphere. The reactions were conducted using the procedure set forth in Example 1. Specific reaction times and temperatures are listed in Table X along with the test results.

TABLE I

| | | | | | PET MODIFIED WITH HYDROQUINONE | | | | | | |
|---|---|---|---|---|---|---|---|---|---|---|---|
| Ex | HQ mole % | Additional Catalyst Sn/Ti, ppm | Stage I Heat Time °C./Hr. | Stage II Heat Time °C./Hr. | Vacuum Buildup Temp/Time °C./Hr. | I.V. dL/g | Film Strength | H Nmr HQ mole % | Mono/Bis Ether of HQ %/%/% | Mz/ Mn | Tg °C. | Tm °C. |
| 1 | 40 | None | 270/2.0 | 290/1.0 | 290/4.5 | 0.42 | creasable | 17.7 | 21/63/16 | 9.1 | 78 | 208 |
| 2 | 40(a) | 150/0 | 230/4/0 | 250–270/2 | 290/2.25 | 0.63 | tough | 12.7 | 0.7/43.6/55.7 | 14.1 | — | 211 |
| 3 | 40 | 100/50 | 270/2.0 | 320/1.0 | 320/0.7 | 0.78(d) | tough | 27.7 | 19/59/22 | 15.9 | 84 | 228 |
| 4 | 40 | 600/0 | 270/1.0 | 290/1.0 | 290/1.7 | 0.64 | v. tough | 19.9 | 22/63/15 | 11.3 | 80 | None |

TABLE I-continued

PET MODIFIED WITH HYDROQUINONE

| Ex | HQ mole % | Additional Catalyst Sn/Ti, ppm | Stage I Heat Time °C./Hr. | Stage II Heat Time °C./Hr. | Vacuum Buildup Temp/Time °C./Hr. | I.V. dL/g | Film Strength | H Nmr HQ mole % | Mono/Bis Ether of HQ %/%/% | Mz/Mn | Tg °C. | Tm °C. |
|---|---|---|---|---|---|---|---|---|---|---|---|---|
| 5 | 40 | 400 ppm Sb(b) | 270/1.0 | 290/1.0 | 290/3.1 | 0.56 | tough | 18.1 | 23/65/12 | 4.3 | 81 | None |
| 6 | 90 | 0/150 | 270/1.0 | 290/1.0 | 290/1.0 | 1.02 | v. tough | 39.5 | 19/68/13 | 16.1 | 87 | None |
| 7 | 125 | None | 270/2.0 | 290/1.0 | 290/3.6 | 0.31 | brittle | 56.2 | 18/67/15 | 2.4 | 84 | None |
| 8 | 125 | 0/50 | 270/1.0 | 290/1.0 | 290/3.0 | 0.76 | v. tough | 53.1 | 19/69/12 | 15.6 | 90 | None |
| 9 | 175 | 0/50 | 270/1.0 | 290/1.0 | 290/2.5 | 0.75 | v. tough | 64.7 | 17/73/10 | 17.1 | 90 | None |
| 10 | 175 | 150/0(c) | 270/1.0 | 290/1.0 | 290/3.0 | 0.87 | v. tough | — | — | 2.4 | — | 219 |
| 11 | 200 | 0/50 | 270/1.0 | 290/1.0 | 290/3.3 | 0.1(d) | brittle | — | — | 2.07 | 104 | None (e) |

(a) PET monomer [bis(2-hydroxyehtyl terephthalate)] was used instead of PET polymer.
(b) Catalyst, in this case, was antimony III ethylene glycoxide.
(c) Catalyst, in this case was stannous oxalate.
(d) Insoluble material noted in the I.V. solvent.
(e) On first heating cycle, endotherms were detected at 158° C. and 179° C. (1.1 and 0.5 cal/g, respectively).

TABLE II

PET MODIFIED WITH BISPHENOL A

| Ex | Bisphenol A mole % | Additional Catalyst Sn/Ti, ppm | Heat Time °C./Hr. | Heat Time °C./Hr. | Heat Time °C./Hr. | Vacuum Buildup Temp/Time °C./Hr. | I.V. dL/g | Film Strength | H Nmr Bis phenol A mole % | Mz/Mn | Tg °C. | Tm °C. |
|---|---|---|---|---|---|---|---|---|---|---|---|---|
| 12 | 20 | 100/50 | None | 1 | 1 | 270/1.9 | 0.45 | tough | 7.6 | — | 82 | 229 |
| 13 | 20(a) | 100/50 | None | 1 | 1 | 270/2.0 | 0.35 | tough | — | 2.5 | 87 | 240 |
| 14 | 30 | 100/50 | None | 1.3 | 1 | 270/2.0 | 0.39 | tough | 9.5 | 3.2 | 82 | 223 |
| 15 | 30 | 100/50 | 230/2.0 | 1 | None | 290/2.5 | 0.65 | v. tough | 10.9 | 7.3 | 84 | None |
| 16 | 30 | 0/150 | 230/2.0 | 1 | 1 | 290/1.5 | 0.77 | v. tough | 14.0 | 19.3 | 86 | None |
| 17 | 50 | 100/0(c) | 230/2.0 | 1 | 1 | 290/4.0 | 0.42 | tough | 14.2 | 2.8 | 86 | None |
| 18 | 30(b) | 150/0(c) | 230/4.0 | 1 | 1 | 290/30 | 0.31 | brittle | 14.2 | 4.0 | 87 | None |

(a) In this case, the PET used was terephthalic acid-based prepared with the following catalyst: Co = 69; Sb = 184; P = 91.
(b) Hexafluorobisphenol A or(4,4'-hexafluoroisopropylidenediphenol).
(c) Source of tin catalyst, in this case, was stannous oxalate.

TABLE III

PET MODIFIED WITH 4,4'-BIPHENOL

| Ex | 4,4'-Biphenol mole % | Additional Catalyst Sn/Ti, ppm | Heat Time °C./Hr. | Heat Time °C./Hr. | Vacuum Buildup Temp/Time °C./Hr. | I.V. dL/g | Film Strength | H Nmr 4,4'-Biphenol mole % | Mz/Mn | Tg °C. | Tm °C. |
|---|---|---|---|---|---|---|---|---|---|---|---|
| 19 | 25 | 100/50 | 270/1.0 | 290/1.1 | 290/2.0 | 0.55 | tough | 13.6 | 7.7 | 90 | 227 |
| 20 | 35 | 100/50 | 270/1.0 | 290/1.1 | 290/2.0 | 0.47 | tough | 18.3 | 5.3 | 86 | 216 |
| 21 | 45 | 100/50 | 270/2.0 | 320/1.1 | 320/0.3 | 0.68 | brittle(a) | 36.4 | 15.7 | 92 | 197 |
| 22 | 65 | 100/50 | 270/1.0 | 290/1.0 | 290/1.5 | 0.45 | tough | 34.5 | 5.9 | 88 | 199 |

(a) The brittleness is probably the result of excess branching as determined by the large Mz/Mn value.

TABLE IV

PET MODIFIED WITH HYDROQUINONE: Effect of Potassium (Carbonate) as a Cocatalyst with Titanium
(Polymerizations at 270° C./1 Hr. + 290° C./1 Hr. + 290° C./Vacuum/0.7-2.0 Hr.)

| Ex | Starting Materials (a) | Catalyst Ti/K ppm | I.V. dL/g | Film Strength | Pressed Film Color | H Nmr HQ Mole % | Ester/Mono-Bis-Ether of HQ %/%/% | Mz/Mn | Tg °C. | Tm °C. |
|---|---|---|---|---|---|---|---|---|---|---|
| 23 | PET + 40 HQ | 50/0 | 0.60 | very tough | amber | 17.5 | 23/64/13 | 3.2 | 81 | None |
| 24 | PET + 40 HQ | 50/50 | 0.53 | very tough | med-lt amber | 18.2 | 21/64/15 | 5 | 83 | None |
| 25 | PET + 40 HQ | 50/100 | 0.56 | very tough | lt. amber | 17.6 | 21/66/13 | 5 | 84 | None |
| 26 | PET + 40 HQ | 50/150 | 0.58 | very tough | lt. yell-amber | 17.3 | 23/65/12 | 4.6 | 84 | None |
| 27 | PET + 40 HQ | 50/200 | 0.60 | very tough | lt. yell-amber | 15.5 | 23/66/12 | 5.3 | 85 | None |
| 28 | PET + 40 HQ | 50/400 | 0.54 | very tough | lt. amber | 17.2 | 21/67/12 | 7.4 | 85 | 198 |
| 29 | PET + 40 HQ | 100/100 | 0.54 | very tough | lt. yell-amber | 16.6 | 22/64/14 | 4.3 | 84 | None |
| 30 | PET + 40 HQ | 100/150 | 0.76 | very tough | lt. amber | 17.4 | 20/66/14 | 16.6 | 85 | 187 |
| 31 | PET + 40 HQ | 100/200 | 0.60 | very tough | lt. amber | 17.7 | 20/66/14 | 9.9 | 84 | 208 |
| 32 | PET + 40 HQ | 150/0 | 0.98 | very tough | dk. red-amber | 16.6 | 20/66/14 | 14.0 | 84 | None |
| 33 | PET + 40 HQ | 150/100 | 0.60 | very tough | med amber | 15.6 | 21/67/12 | 7.8 | 81 | 216 |
| 34 | PET + 40 HQ | 150/200 | 0.68 | very tough | med amber | 16.7 | 21/63/16 | 8.4 | 79 | None |
| 35 | PET + 90 HQ | 50/0 | 0.67 | very tough | dk. amber | 39.4 | 19/68/13 | 15.6 | 87 | None |
| 36 | PET + 90 HQ | 50/50 | 0.53 | very tough | med. amber | 37.0 | 17/70/13 | 5.2 | 86 | None |
| 37 | PET + 90 HQ | 50/100 | 0.73 | very tough | med-lt amber | 38.2 | 18/70/12 | 11.6 | 90 | None |
| 38 | PET + 90 HQ | 50/150 | 0.48 | tough (thin) | lt. amber | 37.3 | 17/70/13 | 4.3 | 86 | None |
| 39 | PET + 125 HQ | 50/0 | 0.76 | very tough | med. amber | 53.1 | 19/69/12 | 15.6 | 90 | None |
| 40 | PET + 125 HQ | 50/100 | 0.59 | very tough | amber | 50.4 | 16/71/13 | 6.8 | 89 | None |

TABLE IV-continued

PET MODIFIED WITH HYDROQUINONE: Effect of Potassium (Carbonate) as a Cocatalyst with Titanium
(Polymerizations at 270° C./1 Hr. + 290° C./1 Hr. + 290° C./Vacuum/0.7–2.0 Hr.)

| Ex | Starting Materials (a) | Catalyst Ti/K ppm | I.V. dL/g | Film Strength | Pressed Film Color | H Nmr HQ Mole % | Ester/Mono-Bis-Ether of HQ %/%/% | Mz/Mn | Tg °C. | Tm °C. |
|---|---|---|---|---|---|---|---|---|---|---|
| 41 | PET + 125 HQ | 50/150 | 0.26 | brittle | amber | 50.1 | 16/68/14 | 2.3 | 82 | None |
| 42 | PET + 125 HQ | 50/200 | 0.36 | brittle | — | 47.1 | 16/70/14 | 2.8 | 85 | None |
| 43 | PET + 125 HQ | 100/300 | 0.36 | brittle | med. amber | 45.5 | 16/71/13 | 2.8 | 84 | None |

TABLE V

Thermal Stability of PET + Hydroquinone Polymers by Scanning Thermogravimetric Analysis

| Ex. | Polymer Composition | Catalysts, ppm Used in Rxn of PET With HQ | Initial Wt. Loss ~°C. | TGA (a) (Heating Rate = 20° C./Min in N$_2$) | | | |
|---|---|---|---|---|---|---|---|
| | | | | ~1 wt. % °C. | ~2 wt. % °C. | ~5 wt. % °C. | ~10 wt. % °C. |
| Control | PET | Mn/Sb/Co/Ti/P | 330 | 375 | 385 | 400 | 411 |
| 44 | PET + 40% HQ | 50 Ti | 385 | 405 | 410 | 425 | 437 |
| 45 | PET + 40% HQ | 100 Ti | 380 | 400 | 410 | 420 | 431 |
| 46 | PET + 40% HQ | 150 Ti | 385 | 405 | 415 | 430 | 440 |
| 47 | PET + 40% HQ | 50 Ti/100 K | — | — | — | — | 448 |
| 48 | PET + 40% HQ | 50 Ti/150 K | — | — | — | — | 438 |
| 49 | PET + 40% HQ | 50 Ti/200 K | — | — | — | — | 438 |
| 50 | PET + 40% HQ | 100 Ti/150 K | — | — | — | — | 430 |
| 51 | PET + 40% HQ | 100 Ti/200 K | — | — | — | — | 449 |
| 52 | PET + 40% HQ | 100 Ti/400 K | — | — | — | — | 433 |
| 53 | PET + 40% HQ | 50 Ti(d) | — | — | — | — | 453 |
| 54 | PET + 40% HQ | 150 Ti/200 K | 385 | 400 | 405 | 420 | 429 |
| 55 | PET + 40% HQ | 300 Sn(b) | 385 | 405 | 410 | 420 | 437 |
| 56 | PET + 40% HQ | 300 Sn(c) | 385 | 400 | 405 | 420 | 431 |
| 57 | PET + 125% HQ | 50 Ti/200 K | — | — | — | — | 436 |

(a) Thermogravimetric Analyses (TGA) weight loss data at other than 10 weight percent loss are estimates from TGA curves.
(b) Source of Sn was n-butylstannoic acid.
(c) Source of Sn was stannous oxalate.
(d) The heating schedule for this sample was 250° C. for 2 hours plus 270° C. for 1 hour plus 290° C. with vacuum.

TABLE VI

PET MODIFIED WITH HYDROQUINONE: Effect of Zeolite 4A as a Catalyst

| Ex | Starting Materials | Catalyst Zeolite 4A Wt % | Heat Time °C./Hr. | Heat Time °C./Hr. | Vacuum Buildup Temp/Time °C./Hr. | I.V. dL/g | Film (a) Strength | H Nmr 4,4-bi phenol Mole % | Ester/Mono/Bis Ether of HQ %/%/%/ | Mz/Mn | Tg °C. | Tm °C. |
|---|---|---|---|---|---|---|---|---|---|---|---|---|
| 58 | PET + 40% HQ | None | 270/2.0 | 290/1.0 | 290/4.5 | 0.42 | creasable | 17.7 | 21/63/16 | 9.1 | 78 | 208 |
| 59 | PET + 40% HQ | None | — | 290/3.0 | 290/3.0 | 0.34(c) | tough (−) | 22.7 | 17/63/20 | 2.4 | 82 | None |
| 60 | PET + 40% HQ | 0.10 | 270/2.0 | 290/1.0 | 290/3.0 | 0.40 | brittle | 21.2 | 19/59/22 | 8.5 | 81 | None |
| 61 | PET + 40% HQ | 0.50 | 270/2.0 | 290/1.0 | 290/3.0 | 0.45 | tough | 19.6 | 21/64/25 | 14.9 | 79 | 209 |
| 62 | PET + 40% HQ | 1.00 | 270/2.0 | 290/1.0 | 290/2.0 | 0.57 | v. tough | 17.1 | 22/65/13 | 11.2 | 85 | None |
| 63 | PET + 40% HQ | 5.00 | 270/2.0 | 290/1.0 | 290/0.5(b) | 0.24(c) | brittle | insol | insol | 15.9 | 89 | 204 |
| 64 | PET + 40% HQ | 5.00 | 270/2.0 | 290/1.0 | 290/0.8(b) | 0.24(c) | brittle | insol | insol | 27.9 | 87 | 204 |

(a) Pressed films were light-medium yellow.
(b) The melt viscosity was very high at the end of the polymerization.
(c) Insoluble material noted in the I.V. solvent.

TABLE VII

PET MODIFIED WITH HYDROQUINONE AND ETHYLENE GLYCOL

| Ex | Starting Materials | Catalyst Sn/Ti ppm | Ethylene Glycol Used, Mole/Mole HQ | Heat Time °C./Hr. | Heat Time °C./Hr. | Vacuum Buildup °C./Hr. | I.V. dL/g | Film Strength | H Nmr HQ Mole % | Ester/Mono/Bis Ether of HQ %/%/%/ | Mz/Mn | Tg °C. |
|---|---|---|---|---|---|---|---|---|---|---|---|---|
| 65 | PET + 40% HQ | None/50 | 0.0 | 200–270/1.8 | 290/1.0 | 290/3.0 | 0.67 | v. tough | 15.6 | 23/66/11 | 8.9 | 85 |
| 66 | PET + 40% HQ | None/50 | 0.0 | 200–270/1.8 | 290/1.0 | 290/2.2 | 0.73 | v. tough | 13.1 | 28/62/10 | 9.8 | 84 |
| 67 | PET + 40% HQ | None/50 | 0.0 | 200–270/1.8 | 290/1.0 | 290/1.7 | 0.41 | creasable | 12.9 | 22/65/13 | 6.3 | 79 |
| 68 | PET + 40% HQ | None/50 | 0.1 | 270/1.0 | 290/1.0 | 290/1.7 | 0.59 | tough | — | — | 7.1 | 80 |

TABLE VII-continued

PET MODIFIED WITH HYDROQUINONE AND ETHYLENE GLYCOL

| Ex | Starting Materials | Catalyst Sn/Ti ppm | Ethylene Glycol Used, Mole/Mole HQ | Heat Time °C./Hr. | Heat Time °C./Hr. | Vacuum Buildup °C./Hr. | I.V. dL/g | Film Strength | H Nmr HQ Mole % | Ester/ Mono/Bis Ether of HQ %/%/%/ | Mz/Mn | Tg °C. |
|---|---|---|---|---|---|---|---|---|---|---|---|---|
| 69 | PET + 40% HQ | None/50 | 0.1 | 200–270/1.7 | 290/1.0 | 290/1.8 | 0.59 | v. tough | 17.8 | 16/70/14 | 8.3 | 80 |
| 70 | PET + 40% HQ | None/50 | 0.2 | 270/1.0 | 290/1.0 | 290/1.5 | 0.59 | tough | — | — | 7.6 | 86 |
| 71 | PET + 40% HQ | None/50 | 0.2 | 200–270/1.8 | 290/1.0 | 290/1.8 | 0.55 | v. tough | 13.4 | 10/73/17 | 8.5 | 80 |
| 72 | PET + 40% HQ | None/50 | 0.5 | 200–270/2.2 | 290/1.0 | 290/1.9 | 0.75 | v. tough | 12.5 | 1/71/28 | 9.8 | 77 |
| 73 | PET + 40% HQ | None/50 | 0.5 | 270/1.3 | 290/1.0 | 290/3.0 | 0.42 | tough (thin) | 12.8 | 2/65/33 | 3.4 | 74 |
| 74 | PET + 40% HQ | 150/None | 0.5 | 200–270/2.2 | 290/1.0 | 290/2.9 | 0.56 | v. tough | 13.9 | 3/70/27 | 4.3 | 77 |

TABLE VIII

PET MODIFIED WITH PHENYLHYDROQUINONE

| Ex | Starting Materials | Catalyst Sn/Ti, ppm | Heat Times °C./Hr. | Heat Times °C./Hr. | Vacuum Buildup Temp/Time °C./Hr. | I.V. dL/g | Film Strength | H Nmr PHQ Mole % | Mz/Mn | Tg °C. | Tm °C. |
|---|---|---|---|---|---|---|---|---|---|---|---|
| 75 | PET + 40 (PHQ) | None/50 | 270/1.0 | 290/1.0 | 290/3.0 | 0.35 | brittle | 17.6 | 3 | 78 | None |
| 76 | PET + 40 (PHQ) | None/150 | 270/3.0 | 290/1.0 | 290/2.3 | 0.36 | brittle | 23 | 2.9 | 85 | None |
| 77 | PET + 40 (PHQ) | 600/None | 270/3.0 | 290/1.0 | 290/0.8 | 0.41 (a) | brittle | insol | 51.1 | 82 | None |
| 78 | PET + 40 (PHQ) | 300/1500 | 270/3.0 | 290/1.2 | 290/2.8 | 0.62 | creasable | 26.9 | 18.5 | 89 | None |

(a) Insoluble material noted in the I.V. solvent.

TABLE IX

TEREPHTHALALTE POLYESTERS MODIFIED WITH HYDROQUINONE

| Ex. | Starting Materials | Catalyst Sn/Ti, ppm | Heat Time °C./Hr. | Heat Times °C./Hr | Vacuum Temp/Time °C./Hr. | I.V. dL/g | Film Strength | H Nmr HQ Mole % | Mz/Mn | Tg °C. | Tm °C. |
|---|---|---|---|---|---|---|---|---|---|---|---|
| Polymer A | Control (a) | None | — | — | — | 0.78 | v. tough | — | — | 95 | 293 |
| 79 | A + 40(HQ) (a) | None/100 | 270/1.0 | 280/1.0 | 290/0.17 | 0.57 | v. tough | 1.6 | 5.46 | 89 | 293 |
| 80 | A + 40(HQ) (a) | 150/None | 270/1.0 | 280/1.0 | 290/0.60 | 0.40 | v. tough | 3.9 | 2.61 | 89 | 293 |
| Polymer B | Control (b) | None | — | — | — | 0.79 | v. tough | — | — | 85 | 261 |
| 81 | B + 40(HQ) (b) | None/50 | 230/5.8 (d) | 280/1.0 | 290/1.0 | 0.61 | v. tough | 1.3 | 3.3 | 88 | 262 |
| 82 | C + 40(HQ) (c) | None/50 | 230/4.0 | 270/1.0 | 290/0.5 | 0.62 | v. tough | 10.3 | 4.7 | 84 | None |

(a) Polymer A is poly(1,4-cyclohexylenedimethylene terephthalate) prepared with 40 ppm Ti catalyst, I.V. of 0.78 which had been dried at 110° C. for 12 hours with full pump vacuum.
(b) Polymer B is poly(1,4-cyclohexylenedimethylene terephthalate) copolyester containing 17 mole % isophthalic acid prepared with 100 ppm Ti catalyst, I.V. 0.79, which had been dried at 110° C. for 12 hours with full pump vacuum.
(c) Polymer C is poly(ethylene terephthaltae) copolyester containing 33 mole % 1,4-cyclohexanedimethanol prepared with 79 ppm Co, 44 ppm Mn, 52 ppm Ti, 8 ppm Sb, and 71 ppm P, I.V. 0.75, which had been dried at 110° C. for 12 hours with full pump vacuum.
(d) Sample was heated at 230–270° C. for 5.8 hours.

TABLE X

MODIFICATION OF VARIOUS POLYESTERS WITH AROMATIC DIOLS

| Ex. | (a) Starting Material | Catalyst Sn/Ti ppm | Heat Times °C./Hr. | Heat Times °C./Hr. | Heat Times °C./Hr. | Vacuum Buildup °C./Hr. | I.V. dL/g | Film Strength | H Nmr Diol Mole % | Mz/Mn | (b) Tg °C. | Tm °C. |
|---|---|---|---|---|---|---|---|---|---|---|---|---|
| 83 | D + 30 (BPA) | 150/0 | 230/4.0 | 250/1.0 | 270/1.0 | 290/2.1 | 1.09 | brittle | 14.2 | 41.9 | 73 | None |
| 84 | F + 30 (HQ) | 150/0 | 230/4.0 | 250/1.0 | 270/1.0 | 290/1.0 | 0.66 | v. tough | 7.1 | 25.1 | 80 | None |
| 85 | G + 40 (HQ) | 0/50 | — | 270/1.0 | 290/1.0 | 290/2.7 | 0.41 | brittle | 19.0 | 8.5 | 119 | 231 |
| 86 | G + 25 (HQ) | 0/100 | — | 270/1.0 | 290/1.0 | 300/4.0 | 0.75 | tough | 13.7 | 5.1 | 121 | 242 |
| 87 | H + 30 (BPA) | 150/0 | 230/4.0 | 240/1.0 | 250/1.0 | 250/2.52 | 0.49 | v. tough | — | 8.8 | 41 | 211 |

TABLE X-continued

MODIFICATION OF VARIOUS POLYESTERS WITH AROMATIC DIOLS

| Ex. | (a) Starting Material | Catalyst Sn/Ti ppm | Heat Times °C./Hr. | Heat Times °C./Hr. | Heat Times °C./Hr. | Vacuum Buildup °C./Hr. | I.V. dL/g | Film Strength | H Nmr Diol Mole % | Mz/Mn | (b) Tg °C. | Tm °C. |
|---|---|---|---|---|---|---|---|---|---|---|---|---|
| 88 | I + 23 (BPA) | 150/0 | 230/4.0 | 240/1.0 | 250/1.0 | 250/2.5 | 0.28 | soft | 16.3 | 3.4 | −3 | None |

(a) Polymer D is poly(ethylene isophthalate); Polymer F is poly(neopentyl terephthalate); Polymer G is poly(ethylene 2,6-napthalate); Polymer H is poly(1,4-butylene terephthalate); and Polymer I is poly(ethylene succinate).
(b) Polymer D, poly(ethylene isophthalate), Tg 68° C.; Polymer F, poly(neopentyl terephthalate), Tg 68° C.; Polymer G, poly(ethylene 2,6-napthalate), Tg 125° C.; Polymer H, poly(1,4-butylene terephthalate), Tg 25° C.; and Polymer I, poly(ethylene succinate), Tg −6° C.

Many variations will suggest themselves to those skilled in this art in light of the above detailed description. All such obvious modifications are within the full intended scope of the appended claims.

What is claimed is:

1. A poly(ester-ether) composition having improved thermal stability consisting essentially of repeat units from the reaction of
   (1) 10 to 175 mole percent based on the repeat units of the polyester, component (2), of at least one dihydroxy aromatic compound, with
   (2) a polyester consisting essentially of repeat units from:
      (a) at least one dicarboxylic acid; and
      (b) at least one diol selected from the group consisting of aliphatic and cycloaliphatic diols, provided that at least 50 mole percent of the diol is an aliphatic diol having 2 to 20 carbon atoms, based on 100 mole percent dicarboxylic acid and 100 mole percent diol.

2. A poly(ester-ether) composition having improved thermal stability consisting essentially of repeat units from the reaction of
   (1) 10 to 175 mole percent based on the repeat units of the polyester, component (2), of at least one dihydroxy aromatic compound, with
   (2) a polyester consisting essentially of repeat units from:
      (a) at least one dicarboxylic acid; and
      (b) at least one diol selected from the group consisting of aliphatic and cycloaliphatic diols, provided that at least 50 mole percent of the diol is an aliphatic diol having 2 to 20 carbon atoms, based on 100 mole percent dicarboxylic acid and 100 mole percent diol; in the presence of
   (3) a polycondensation catalyst.

3. The composition of claim 1 wherein the dihydroxy aromatic compound, component (1), is selected from the group consisting of hydroquinone, resorcinol, catechol, 4,4′-biphenol, bisphenol A, phenylhydroquinone, methylhydroquinone, 1,4-dihydroxynaphthalene, chlorohydroquinone, and combinations thereof.

4. The composition of claim 3 wherein the dihydroxy aromatic compound, component (1), is selected from the group consisting of hydroquinone, 4,4′-biphenol, and bisphenol A.

5. The composition of claim 4 wherein the dihydroxy aromatic compound, component (1), is hydroquinone.

6. The composition of claim 1 wherein 20 to 60 mole percent, based on the repeat units of the polyester, of the dihydroxy aromatic compound is reacted with the polyester, component (2).

7. The composition of claim 6 wherein 30 to 40 mole percent, based on the repeat units of the polyester, of the dihydroxy aromatic compound is reacted with the polyester, component (2).

8. The composition of claim 1 wherein the dicarboxylic acid, component (a) of the polyester is selected from the group consisting of aliphatic dicarboxylic acids having 4 to 14 carbon atoms, cycloaliphatic dicarboxylic acids having 8 to 12 carbon atoms, and aromatic dicarboxylic acids having 8 to 14 carbon atoms.

9. The composition of claim 8 wherein the dicarboxylic acid, component (a), is selected from the group consisting of naphthalene dicarboxylic acid, succinic, dodecanedioic, glutaric, adipic, 1,3-cyclopentane dicarboxylic, cyclohexanedicarboxylic, phthalic, terephthalic, isophthalic, 2,5-norbornanedicarboxylic, diphenic, 4,4′-oxydibenzoic, diglycolic, thiodipropionic, 4,4′-sulfonyldibenzoic, and ester derivatives of said dicarboxylic acids.

10. The composition of claim 9 wherein the dicarboxylic acid, component (a), is selected from the group consisting of terephthalic acid, isophthalic acid, naphthalene-2,6-dicarboxylic acid, and cyclohexanedicarboxylic acid.

11. The composition of claim 10 wherein the dicarboxylic acid, component (a), is terephthalic acid.

12. The composition of claim 1 wherein the diol, component (b), of the polyester is selected from the group consisting of ethylene glycol, 1,3-butane diol, 1,2-propanediol, 1,3-propanediol, 1,4-butanediol, 1,5-pentanediol, 1,6-hexanediol, and combinations thereof.

13. The composition of claim 12 wherein the diol, component (b), of the polyester is ethylene glycol.

14. The composition of claim 1 wherein the polyester, component (1), is polyethylene terephthalate.

15. A molded article comprising the composition of claim 1.

16. A molded article comprising the composition of claim 2.

17. The composition of claim 2 wherein the polycondensation catalyst, component (3), is present in an amount of 50 ppm catalyst to 600 ppm catalyst.

18. The composition of claim 2 wherein the metal catalyst, component (3), is selected from the group consisting of titanium derived from tetraisopropyl titanate, tin derived from stannous oxalate or n-butylstannoic acid, and combinations thereof.

19. The composition of claim 2 which additionally contains a co-catalyst.

20. The composition of claim 19 wherein the co-catalyst is a potassium salt.

21. The composition of claim 20 wherein the potassium salt is potassium carbonate.

22. The composition of claim 19 wherein the co-catalyst is a zeolite molecular sieve.

23. The composition of claim 22 wherein the zeolite molecular sieve is zeolite 4A.

24. A process for preparing a poly(ester-ether) having improved thermal stability consisting essentially of
   (I) reacting (1) 10 to 175 mole percent based on the repeat units of the polyester, component (2), of at least one dihydroxy aromatic compound, with (2) a polyester consisting essentially of repeat units from:

(a) at least one dicarboxylic acid; and (b) at least one diol selected from the group consisting of aliphatic and cycloaliphatic diols, provided that at least 50 mole percent of the diol is an aliphatic diol having 2 to 20 carbon atoms, based on 100 mole percent dicarboxylic acid and 100 mole percent diol; and (II) forming the poly(ester-ether) into a molded or extruded article.

25. A process for preparing a poly(ester-ether) having improved thermal stability consisting essentially of (I) reacting (1) 10 to 175 mole percent based on the repeat units of the polyester, component (2), of at least one dihydroxy aromatic compound, with (2) a polyester consisting essentially of repeat units from:

(a) at least one dicarboxylic acid; and (b) at least one diol selected from the group consisting of aliphatic and cycloaliphatic diols, provided that at least 50 mole percent of the diol is an aliphatic diol having 2 to 20 carbon atoms, based on 100 mole percent dicarboxylic acid and 100 mole percent diol; and (3) a metal catalyst; and (II) forming the poly(ester-ether) into a molded or extruded article.

* * * * *